United States Patent [19]

Tabor

[11] Patent Number: 4,909,929

[45] Date of Patent: Mar. 20, 1990

[54] INTERLOCKING CLAMPING SYSTEM

[75] Inventor: Hollis H. Tabor, Princeton, W. Va.

[73] Assignee: Norris Screen & Manufacturing, Inc., Princeton, W. Va.

[21] Appl. No.: 261,117

[22] Filed: Oct. 24, 1988

[51] Int. Cl.[4] .......................... B07B 1/12; B07B 1/46
[52] U.S. Cl. .................................. 209/400; 209/395; 209/405; 209/408; 209/412
[58] Field of Search ............... 209/392, 393, 395, 397, 209/399, 400, 401, 403–405, 408, 409, 412, 414

[56] References Cited

U.S. PATENT DOCUMENTS

| | | | |
|---|---|---|---|
| 1,856,450 | 5/1932 | Xistris | 209/414 X |
| 3,042,206 | 7/1962 | Olender | 209/395 |
| 3,483,974 | 12/1969 | Pearsall | 209/395 X |
| 3,795,311 | 3/1974 | Martin | 209/405 X |
| 3,980,555 | 9/1976 | Freissle | 209/408 |
| 4,141,821 | 2/1979 | Wolff | 209/395 X |
| 4,265,742 | 5/1981 | Bücker et al. | 209/405 X |
| 4,283,278 | 8/1981 | Savage et al. | 209/405 X |
| 4,375,408 | 3/1983 | Anderson | 209/408 X |
| 4,409,099 | 10/1983 | Wolff | 209/405 X |
| 4,661,245 | 4/1987 | Rutherford et al. | 209/408 X |
| 4,762,610 | 8/1988 | Freissle | 209/408 X |

FOREIGN PATENT DOCUMENTS

| | | | |
|---|---|---|---|
| 0908425 | 3/1982 | U.S.S.R. | 209/412 |
| 0691617 | 5/1953 | United Kingdom | 209/393 |

OTHER PUBLICATIONS

"Bee-Zee Screen" brochure of Bixby-Zimmer Engineering Co., Galesburg, Ill., Sep. 1967.

Primary Examiner—Margaret A. Focarino
Assistant Examiner—Edward M. Wacyra
Attorney, Agent, or Firm—Clifton Ted Hunt

[57] ABSTRACT

An interlocking clamping system for the components of a sieve deck having a foraminated surface defined by rows of stainless steel profile wire held in laterally spaced relation to each other on transverse support rods for processing granular material. The interlocking clamping system eliminates the need for providing a heavy reinforced frame around each modular screen section by including as a part of the clamping system pairs of elongated retainer bars between longitudinal rows of modular screen sections. Each retainer bar receives and retains corresponding ends of the transverse support rods in a plurality of modular screen sections. Locking pins extend through sockets in the retainer bars to releasably connect the modular screen sections to an underlying base. The removal and replacement of individual screen sections is possible when desired without disturbing the other screen sections. A movable dam is provided with an effective seal to prevent leakage between adjacent screen sections.

11 Claims, 4 Drawing Sheets

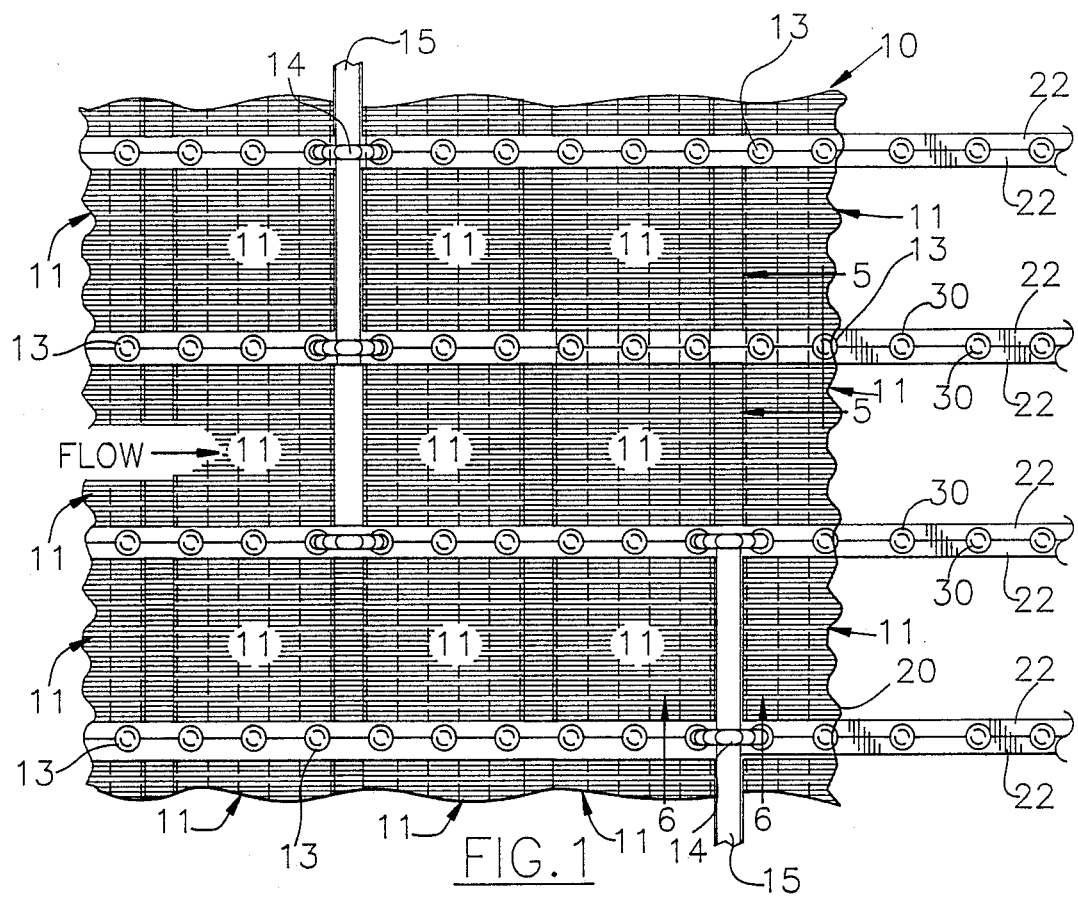
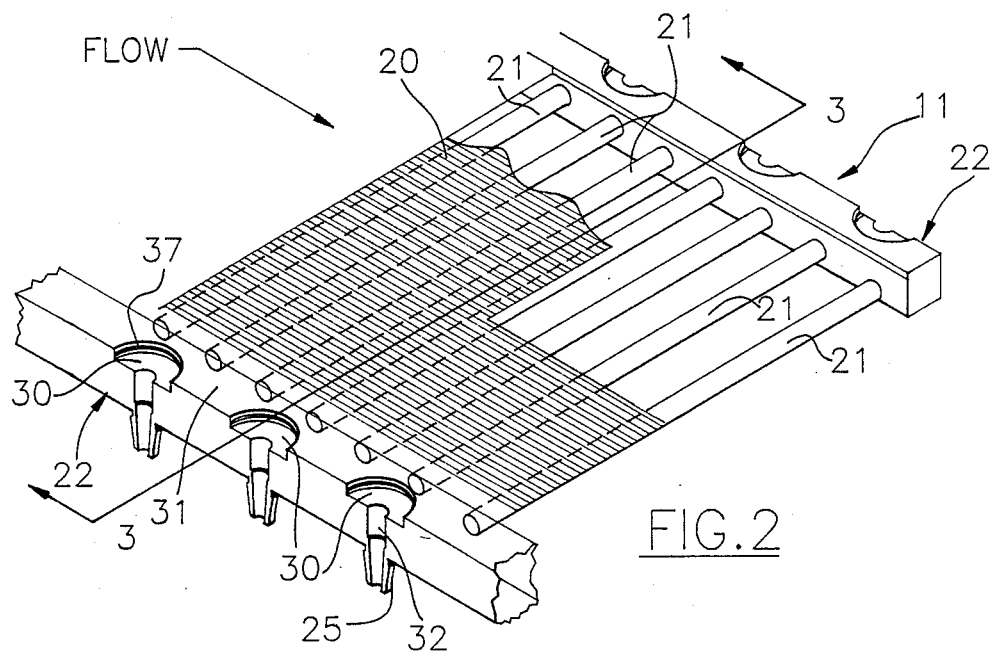
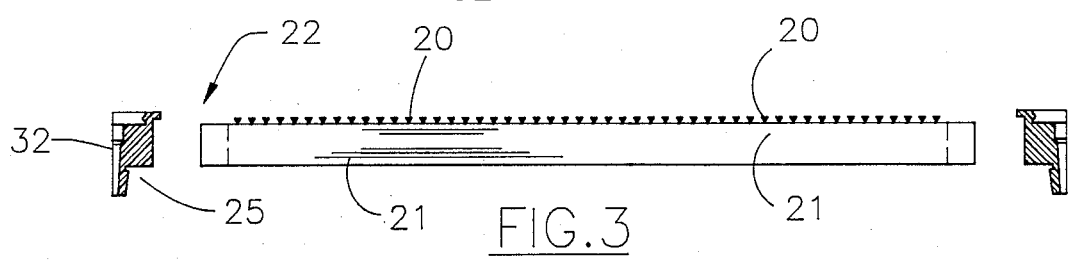

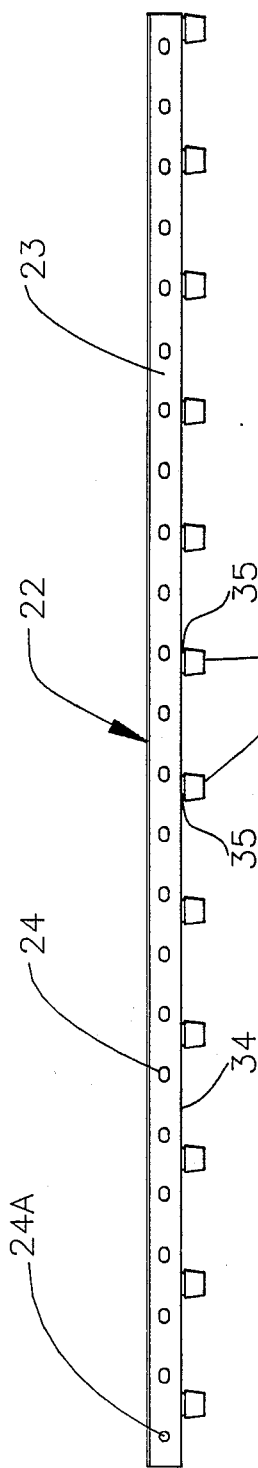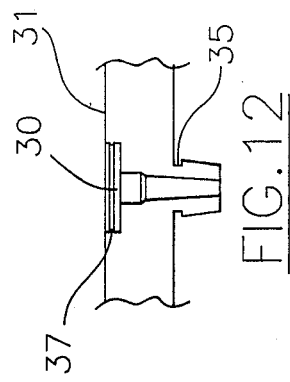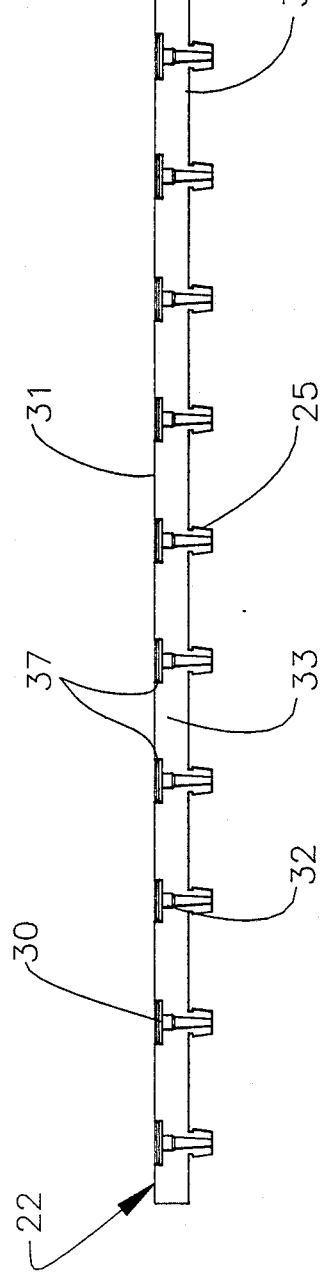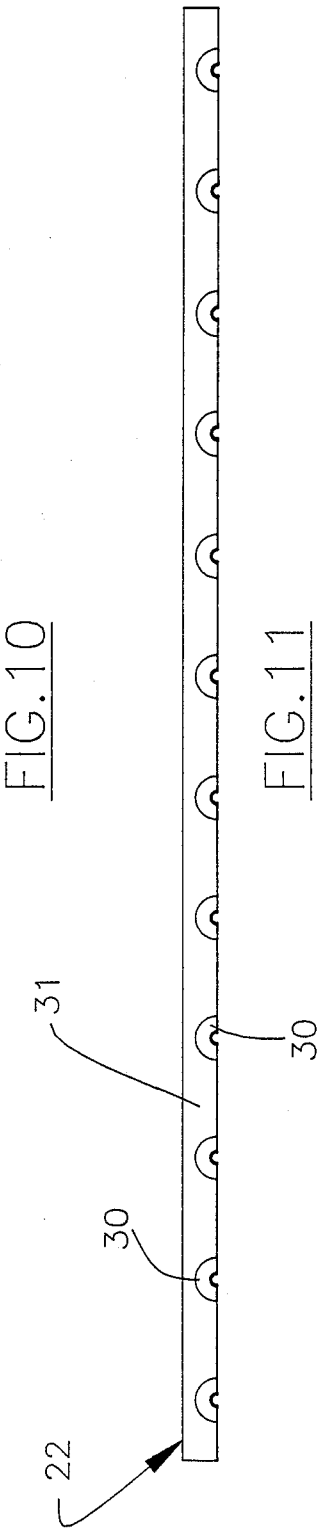

INTERLOCKING CLAMPING SYSTEM

FIELD OF THE INVENTION

This invention relates to a modular screen system for separating water from coal and for separating pieces of coal and other granular material according to size.

BACKGROUND OF THE INVENTION

Screen systems used in the coal industry and elsewhere to separate water from granular material being processed and to separate granular material according to size have one or more sieve decks, each of which comprises a plurality of removable and replacable modular screen sections supported on a base such as channel irons or other structural material. Modular screen sections of the prior art include a foraminated surface formed from plastic or stainless steel profile wires and surrounded by a frame formed from a durable plastic such as polyurethane reinforced with metal rods embedded in the plastic.

It is known in the prior art to make the modular screen sections of uniform cross-sectional dimensions and to releasably attach the abutting screen sections to the underlying base with locking pins. See, for example:
U.S. Pat. No. 3,980,555 issued Sept. 14, 1976 to Freissle for REPLACABLE SCREEN WITH FRAME;
U.S. Pat. No. 4,141,821 issued Feb. 27, 1979 to Wolff for SCREENING DECK ASSEMBLY; and
U.S. Pat. No. 4,409,099 issued Oct. 11, 1983 to Wolff for SIEVE DECK FOR SIFTING MACHINES.

The locking pins disclosed in these patents, and the locking pins in all prior art screen assemblies known to applicant, are intended to hold the abutting screen sections tightly against each other to prevent undesirable leakage of granular material between the abutting screen sections. Nevertheless, leakage does occur between the longitudinal ends of adjoining screen sections of the prior art when fine gauge material is being processed on screens formed with stainless steel profile wire as the sieve deck. It is known to put foam rubber over the juncture between the longitudinal ends of adjoining screen sections and anchor it in place with angle irons in an effort to control the leakage, but the prior art attempts to control the leakage have not been successful because the angle irons become loosened and the foam rubber deteriorates.

The locking pins in all prior art screen assemblies known to applicant do not extend above the surface of the screen. It is, in fact, accepted practice to specifically structure the prior art locking pins so they will not protrude above the surface of the screen. It has been thought that locking pins protruding above the surface of the screen will undesirably interfere with the flow of the granular material being processed.

It has been recognized in the prior art, however, that it is desirable to provide one or more dams extending across at least part of the path of the granular material being processed to control the flow of the granular material. Most prior art dams are formed integrally with the screen sections, but U.S. Pat. No. 4,141,821 to Wolff shows a movable dam with its own pins.

SUMMARY OF THE INVENTION

Applicant's modular screen system comprises uniformly sized and shaped modular screen sections using stainless steel profile wire as the foraminated surface and held in place with interlocking clamping members which cooperate to pre-fit individual modular screen sections into the system as required.

Each modular screen section comprises rows of transversely spaced stainless steel profile wire extending longitudinally in the direction of flow and welded to transverse support rods with the ends of the profile wire in one screen section slightly spaced from the ends of the profile wire in adjoining upstream and downstream screen sections.

A pair of elongated retainer bars made from wear resistant polyurethane or the like extend longitudinally between the proximal lateral edges of a plurality of laterally spaced screen sections. The retainer bars are connected to the ends of the transverse support rods in longitudinally aligned screen sections. The retainer bars also connect the modular screen sections to an underlying base with locking pins.

Movable dams which are the same length as the transverse dimension of the individual screen sections are held in selected locations on the sieve deck. Two or more dams may be abutted end to end on adjacent screen sections to make the dam as long as desired. A flexible seal is fitted to the bottom of each dam to prevent leakage beneath the dam.

The locking pin has an enlarged head which protrudes above the surface of the screen and projects into the flow of the granular material to contribute to the agitation and desired separation of the material.

The interlocking clamping system of the invention comprises the the retainer bars which unite the modular screen sections and join them to the base of the system, and the locking pins and bridge pins which releasably connect the modular screen sections to the base of the system.

BRIEF DESCRIPTION OF THE DRAWINGS

FIG. 1 is a top plan view of a sieve deck illustrating retainer bars and locking pins interconnecting a plurality of uniformly sized modular screen sections with movable dams at selected locations;

FIG. 2 is a perspective view, with parts broken away, of one of the screen sections removed from the sieve deck of FIG. 1;

FIG. 3 is an exploded sectional view taken substantially along the line 3—3 in FIG. 2;

FIG. 9 is a side view of a retainer bar;

FIG. 10 is a side view looking at the opposite side of the retainer bar shown in FIG. 9;

FIG. 11 is a top view of the retainer bar shown in FIG. 9; and

FIG. 12 is an enlarged fragmentary side view of a portion of the retainer bar shown in FIG. 10, illustrating the configuration of the semi-spherical sockets.

DETAILED DESCRIPTION OF THE INVENTION

Figure 4:
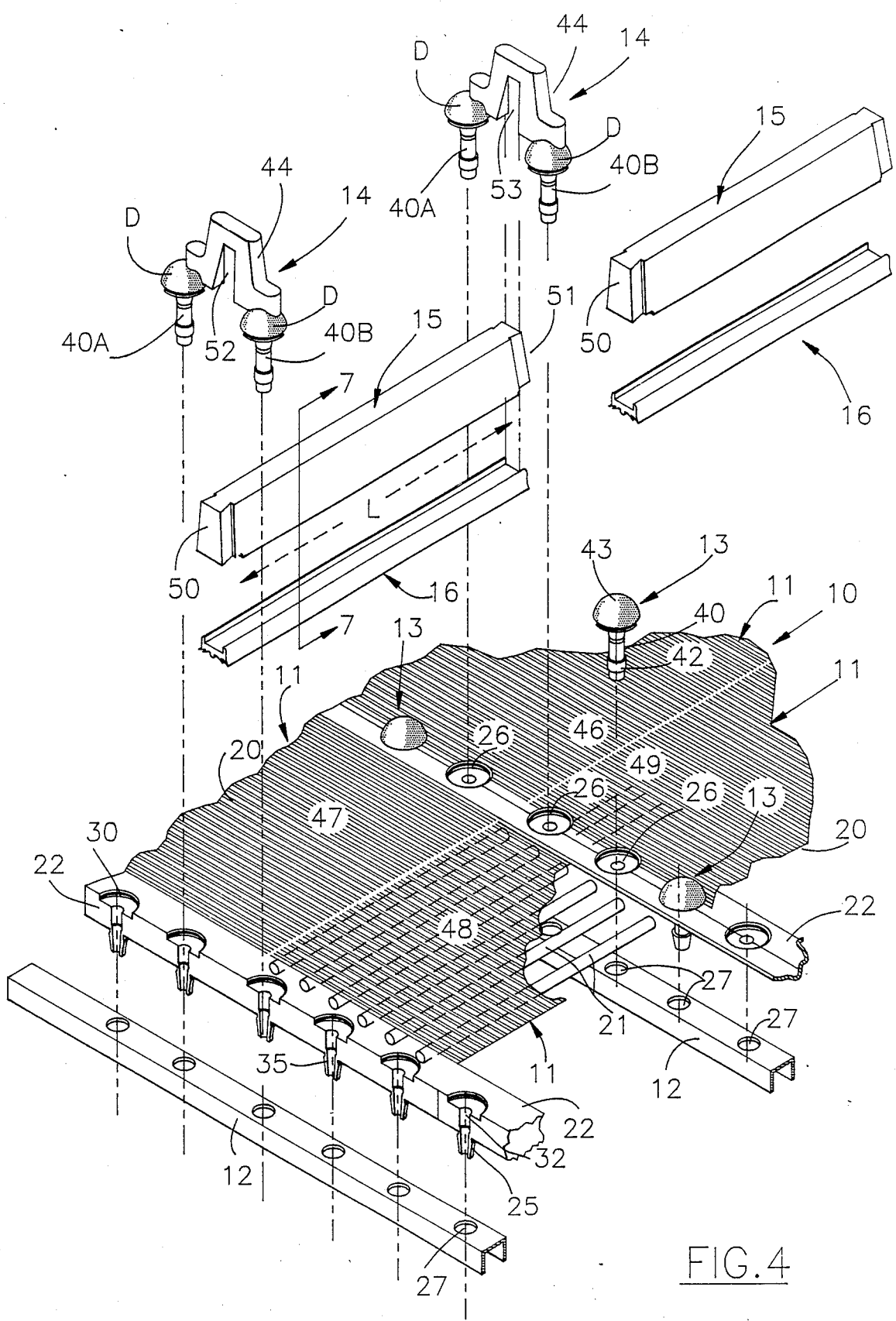
FIG. 4 is an exploded perspective view illustrating the assembly of the components of the sieve deck.

Referring more specifically to the drawings, the numeral 10 broadly indicates a sieve deck comprising a plurality of modular screen sections 11 removably supported on a suitable base, illustrated as channel irons 12, by an interlocking clamping system including locking pins 13, bridge pins 14, dams 15, and flexible seals 16. The granular material processed on the sieve deck 10 flows longitudinally of the sieve deck as indicated by the directional arrows in FIGS. 1 and 2.

The Modular Screen Sections

Figure 6:
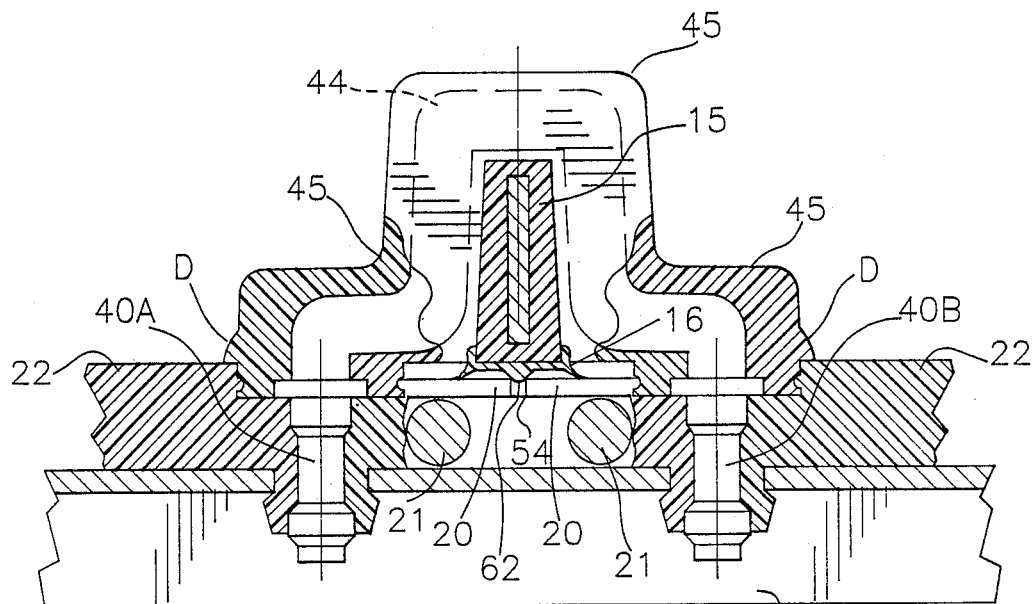
FIG. 6 is a sectional view taken substantially along the line 6—6 in FIG. 1.
Figure 7:
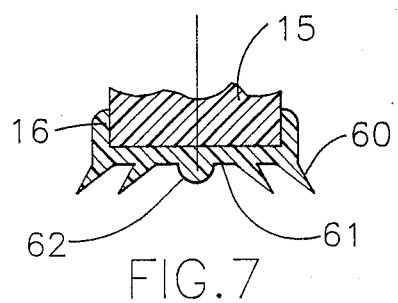
FIG. 7 is an enlarged sectional view illustrating the connection of the flexible seal to the bottom of the dam in FIG. 6.
Figure 8:
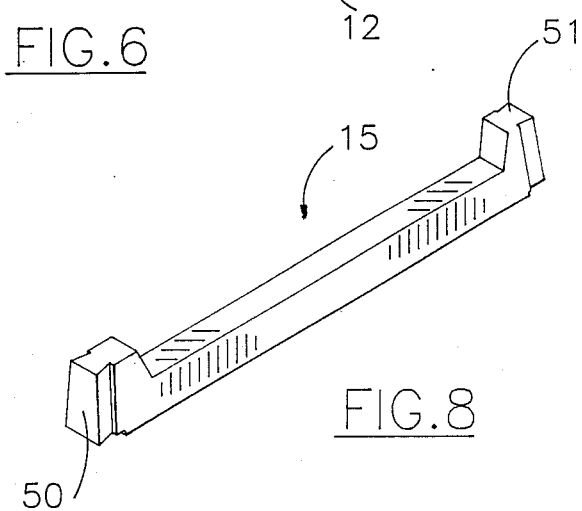
FIG. 8 is a perspective view of the dam removed from the sieve deck.

Each modular screen section 11 has a foraminated area which, in the illustrated embodiment, is formed of closely spaced stainless steel profile wires 20. The profile wires 20 extend longitudinally of the sieve deck with the ends of the profile wires 20 in each screen section closely spaced from the ends of the profile wires 20 in adjoining upstream and downstream screen sections, as illustrated in FIGS. 4 and 6.

The profile wires in each screen section are welded in predetermined spaced relation to each other to transversely extending steel support rods 21, the spacing depending on the size of the granular material to be processed. The support rods 21 in each screen section 11 extend transversely slightly beyond the profile wires and are supported by retainer bars 22 formed from a wear resistant material, such as polyurethane.

The Retainer Bars

Retainer bars 22 extend longitudinally along both sides of each screen section 11 in engagement with the ends of the transverse support rods 21, as seen in FIG. 2. The retainer bars 22 are longer than an individual screen section 11. The individual screen sections may be of any desired uniform dimensions and the retainer bars may be of any length within the spirit of the invention. In the illustrated embodiment, for example, each screen section 11 is one foot square and each retaining bar 22 is four feet long and accomodates the support rods of four longitudinally spaced screen sections 11.

One wall 23 (FIG. 9) of each retainer bar 22 has retainer recesses 24 formed therein to receive and retain corresponding ends of the transverse support rods 21. Retainer recesses 24 are slightly elongated beyond the diameter of the support rods 21 to facilitate insertion of the support rods 21 in the retainer recesses 24. A circular pilot recess 24A is provided at one end of each retainer bar to insure alignment of the retainer recesses with the correspondingly spaced support rods.

Uniformly spaced semi-spherical sockets 25 are formed integrally with each of the two retainer bars between transversely spaced screen sections 11. The semi-spherical sockets 25 mate with each other when assembled as shown in FIG. 4 so that the semi-spherical sockets 25 on the two retainer bars 22 between transversely spaced screen sections 11 define tubular sockets 26. The tubular sockets 26 extend downwardly to be received in correspondingly spaced holes 27 in the base represented by channel irons 12.

Figure 5:
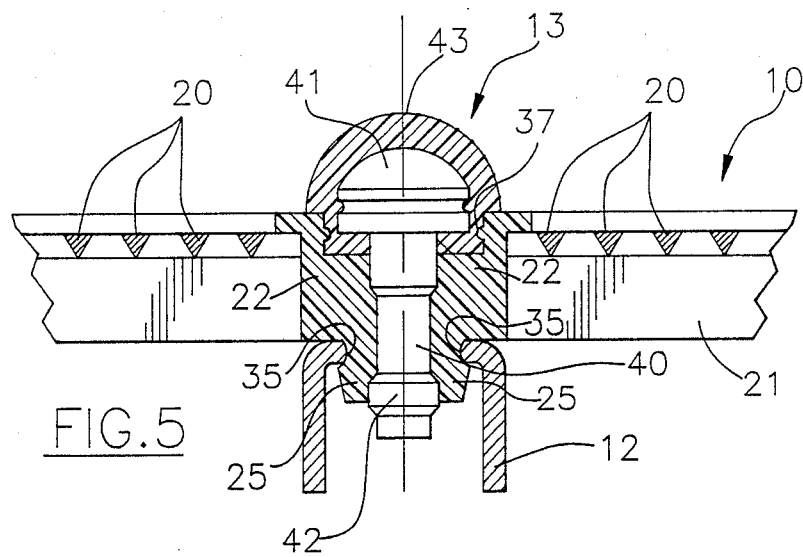
FIG. 5 is a sectional view taken substantially along the line 5—5 in FIG. 1.

Each semi-spherical socket 25 has a semicircular recess 30 in its top wall 31 communicating with an arcuate cavity 32 in the side wall 33 of each retainer bar 22 (FIGS. 10 and 11). The cavity leads into the semi-spherical socket 25 projecting beyond the lower wall 34 of each retainer bar. Each semispherical socket 25 has an annular groove 35 beneath the bottom wall 34 of the retainer bar. The groove 35 engages an anchor portion of the base, represented by the top wall 36 of the channel iron 12, when a locking pin 13 or bridge pin 14 is driven through a tubular socket 26, as in FIG. 5.

An anchor rib 37 (FIGS. 5 and 12) extends radially inwardly from the vertical wall of the recess 30 to fit within a groove in the pins 13 and 14 when assembled.

Use of the retainer bars 22 eliminates the costly step of putting a heavy frame around each screen section, as in the prior art.

The Locking Pins

Locking pins 13 are driven through the tubular sockets 26 in adjacent retainer bars and through holes 27 in the channel iron base 12 to anchor the screen sections 11 to the base. Each locking pin 13 comprises a shaft 40 and a head 41 formed from a durable and rigid material such as nylon. The shaft 40 is shaped to conform with the configuration of the cavities 30 in the sockets 26 and to extend beyond the socket when the pin is operably installed, as in FIG. 5. When the pin 13 is operably installed, an annular rib 42, extending circumferentially around the shaft 40, radially expands the semi-spherical sockets 25 within the channel iron base 12 and forces the grooves 35 in the semi-spherical sockets 25 radially outward into locking engagement with the top edge of the channel iron base 12 to unite the screen sections held by the retainer bars with the base.

A dome 43, formed from wear resistant material such as polyurethane, is molded about the head 41 of each pin 13 (FIG. 5) and projects above the surface of the sieve deck 10 to serve as a diverter when the pin 13 is operatively positioned. The pin 13 can be removed when desired by levering it out with a screwdriver.

The Bridge Pins

As best seen in FIG. 6, each bridge pin 14 includes two shafts 40A and 40B spaced apart a distance equal to the spacing of the semi-spherical sockets 25 in the retainer bars 22. The shafts 40A and 40B are like the shaft 40 in locking pin 13 and function in the same manner to fasten the retainer bars and screen sections to the channel iron.

The shafts 40A and 40B are united by an elevated bridge 44 that has an inverted U-shaped configuration in the operative position of FIG. 4. The rigid bridge 44 is molded inside a wear resistant material 45, such as polyurethane, with domes D atop the shafts 40A and 40B. Bridge pins 14 connect adjacent screen sections, either longitudinally or transversely of the sieve deck, by positioning, for example, the shaft 40A in the tubular socket 26 nearest the adjoining corners of two screen sections indicated at 46 and 47 in FIG. 4. The shaft 40B is positioned in the socket 26 nearest the corners of two adjoining screen sections 48 and 49 downstream from the screen sections 46 and 47. All four screen sections are united by the bridge pin 14 with the underlying channel iron 12. The bridge pins may also be used in the medial socket and one corner socket between two transversely spaced screen sections, but it is generally more practical to use the locking pins 13 except to attach a dam in a desired location.

The Dam

The dam 15 is formed from wear resistant material such as polyurethane reinforced with a bar 57 of rigid material, such as steel, embedded in the wear resistant outer covering. The dam 15 is of rectangular configuration having an operative length (indicated at L in FIG. 4) equal to the distance across one of the screen sections 11.

Dovetail connectors 50 and 51 extend beyond the operative length of the dam for engagement with correspondingly shaped dovetailed receivers 52 and 53 in the bridges of two bridge pins 14 in FIG. 4. The dovetailed receivers 52 and 53 communicate with both sides of the bridges 44 on the bridge pins 14 so that the bridge element of one pin can connect two abutting dams 15, as illustrated in FIG. 4. Dams 15 are illustrated in FIGS. 4 and 6 as being located over the juncture between two screen sections but it is to be understood that the dam may extend across the medial portion of one or more screen sections 11 if desired.

There is a small space (indicated at 54 in FIG. 6) between the ends of the profile wire in adjoining screen secions. When the dam is positioned between two screen sections as illustrated in FIGS. 4 and 6, some of the granular material tends to leak through the space 54. The flexible seal 16 is placed between the dam 15 and profile wire 20 to prevent the leaking of material through the space. The seal 16 is the same length as the operative length L of the dam. Ribs 60 extend along the bottom wall 61 of the seal 16 with a medial rib 62 positioned to overlie the space 54 to minimize leakage.

SUMMARY

There is thus provided an effective seal between adjacent screen sections and an interlocking clamping system for holding the seal in place and for releasably holding the screen sections in operative position. The locking pins and the bridge pins are easily installed and removed without special equipment and individual screen sections can be removed and replaced when worn without replacing the entire sieve deck.

In the illustrated embodiment, the modular screen sections each measure one foot square and the retainer bars 22 are four (4) feet long, but the overall dimensions are not critical. It is important, of course, that the sockets 26, the holes 27 in the channel irons 12, and the shafts 40A and 40B all be spaced apart the same distance to selectively remove and 15 as desired on the sieve deck.

Although specific terms have been used in describing the invention, they have been used in a descriptive and generic sense only and not for the purpose of limitation. It is recog ized that variations in the structure and assembly of the invention may be made within the scope of the claims.

I claim:

1. A modular screen system comprising modular screen sections of stainless steel profile wire having transversely extending support rods and said screen sections being spaced longitudinally and transversely of each other on a supporting base of the type having longitudinally extending transversely spaced channel irons having uniformly spaced holes to receive fastener pins, a pair of longitudinally extending retainer bars formed of a yieldable wear resistant material on opposite lateral edges of each said modular screen section, means connecting transversely spaced adjoining screen sections to the retainer bars, each retainer bar in said pair of retainer bars having a plurality of semi-spherical sockets extending beneath the screen sections in assembled relation and the semi-spherical sockets on one retainer bar in each pair of retainer bars registering with the semi-spherical sockets on another retainer bar of an adjoining screen section to define uniformly spaced tubular sockets along the length of the retainer bars registrable with the uniformly spaced holes in the base, and a fastener pin receivable within each tubular socket and the corresponding hole in the base for releasably fastening the retainer bars and the modular screen sections of stainless steel profile wire to the base, whereby the registered sockets and pins provide the only connection of the modular screen sections to the base.

2. Apparatus according to claim 1 wherein each said pin comprises a rigid shaft, a head on one end of the shaft, and an annular shoulder spaced inwardly from the other end of the shaft sufficiently to be placed beneath the corresponding hole in the base when assembled, whereby the semi-spherical sockets are radially displaced beneath the holes in the base to lock the pin in place and to clamp the modular stainless steel screen sections to the base.

3. Apparatus according to claim 2 wherein said heads are formed integrally with the shafts of the pins and project above the surface of the modular screen sections when the pins are operatively assembled, and a dome of yieldable wear resistant material covering the head of each pin.

4. Apparatus according to claim 2 wherein an annular rib extends radially inwardly from each semi-spherical socket and the head of each pin has an annular groove registrable in assembled relation with the annular rib in a socket, whereby the heads of the pins are locked to the retainer bars.

5. A modular screen system for processing granular material, said screen system having a sieve deck defined by a plurality of modular screen sections of stainless steel profile wire supported on a base, wherein the improvement comprises at least one seal between adjoining screen sections, an interlocking clamping system connecting the adjoining screen sections and maintaining the seal between screen sections, the interlocking clamping system including a dam overlying at least one seal, means for releasably attaching the dam to said adjoining screen sections, said means comprising retainer bars extending longitudinally between the screen sections, bridge pins extending over the dam, and said bridge pins including means cooperating with the retainer bars to fasten the dam to the sieve deck.

6. Retainer bars and locking pins for use with a modular screen system having a sieve deck supported on a base of a screen for separating granular material according to size and the sieve deck having a plurality of modular screen sections each including longitudinally extending profile wire and transversely extending support rods, said retainer bars being formed of yieldable wear resistant material independently of the modular screen sections, said retainer bars including means for releasably attaching the said support rods to the retainer bars, said retainer bars including additional means to receive and retain the locking pins in releasable locking relation to the base, said additional means comprising a plurality of semi-spherical sockets extending from the bottom of each retainer bar and penetrating the base and a second retainer bar of the type described arranged with its semi-spherical sockets cooperating with the first-named semi-spherical sockets to define tubular sockets to receive the locking pins, at least some of said locking pins being bridge pins, each bridge pin comprising a pair of rigid shafts registrable with adjacent tubular sockets defined by the cooperating retainer bars, and an elevated bridge connecting the shafts.

7. Apparatus according to claim 6 wherein the elevated bridge is covered with yieldable wear resistant material.

8. Apparatus according to claim 6 wherein a transversely extending dam overlies the juncture between two modular screen sections, and the elevated bridges of two bridge pins extend over the ends of the dam with the shafts of the bridge pins seated in said tubular sockets defined by a pair of adjoining retainer bars between transversely spaced modular screen sections.

9. Apparatus according to claim 8 wherein a seal is provided between the dam and the juncture between said two modular screen sections.

10. Apparatus according to claim 8 wherein the seal is formed from a compressible material and includes flexible ribs pressed against the proximal portions of the profile wire in the screens upstream and downstream from the dam.

11. Apparatus according to claim 9 wherein a medial rib extends from the dam in overlying relation to the juncture between said two modular screen sections.

* * * * *